United States Patent [19]

Moller

[11] 3,969,455

[45] July 13, 1976

[54] METHOD FOR FORMING, SEALING, CAPPING AND PASTEURIZATION OF BEVERAGE IN PLASTIC CONTAINER

[75] Inventor: Jens L. Moller, Westmont, Ill.

[73] Assignee: Continental Can Company, Inc., New York, N.Y.

[22] Filed: May 25, 1970

[21] Appl. No.: 40,302

[52] U.S. Cl. ............................ 264/89; 53/42; 156/69; 264/96; 264/249; 425/DIG. 207
[51] Int. Cl.² .................................... B29C 17/07
[58] Field of Search .............. 264/89, 93, 94, 249, 264/96, 97, 98, 99, DIG. 41; 53/42, 329; 156/69; 425/109, 324 B, 326 B, 326 BJ, 387 B, DIG. 207

[56] References Cited
UNITED STATES PATENTS

| | | | |
|---|---|---|---|
| 1,981,334 | 11/1934 | Schmalz | 264/249 X |
| 2,809,399 | 10/1957 | Mead | 264/249 X |
| 3,084,396 | 4/1963 | Abt | 264/98 |
| 3,122,274 | 2/1964 | Quinche | 264/249 X |
| 3,124,083 | 3/1964 | Atwood | 264/93 X |
| 3,162,706 | 12/1964 | Cheney | 264/97 |
| 3,251,915 | 5/1966 | Pechthold | 264/94 |
| 3,491,181 | 1/1970 | Keil et al. | 264/249 X |
| 3,577,291 | 5/1971 | Uchida | 156/69 X |

*Primary Examiner*—Jan H. Silbaugh
*Attorney, Agent, or Firm*—Diller, Brown, Ramik & Wight

[57] ABSTRACT

This disclosure relates to a method utilizing an apparatus defining an open ended mold cavity, operable in conjunction with a piston supporting a closure cover for a container to be formed in the cavity which is shiftable inwardly into the open end of the cavity. The method involves introducing a blank of heated plastic material into the mold cavity inwardly of the open end thereof first introducing gas or a similar fluid or fluent material and then a beverage or a similar fluid or fluent material under pressure into the cavity at a point spaced outwardly of the blank and inwardly of the closure cover and piston after the latter has been shifted into the outer end of the cavity to seal the latter. The introduced gas is under sufficient pressure for pre-blow molding blank and the subsequently introduced beverage is under sufficient pressure to complete the blow molding of the blank in the mold. Thereafter, the piston, with the closure cover thereon, is further shifted inwardly of the mold cavity for bonding to the upper peripheral portions of the blow molded blank and closing the container defined thereby.

15 Claims, 7 Drawing Figures

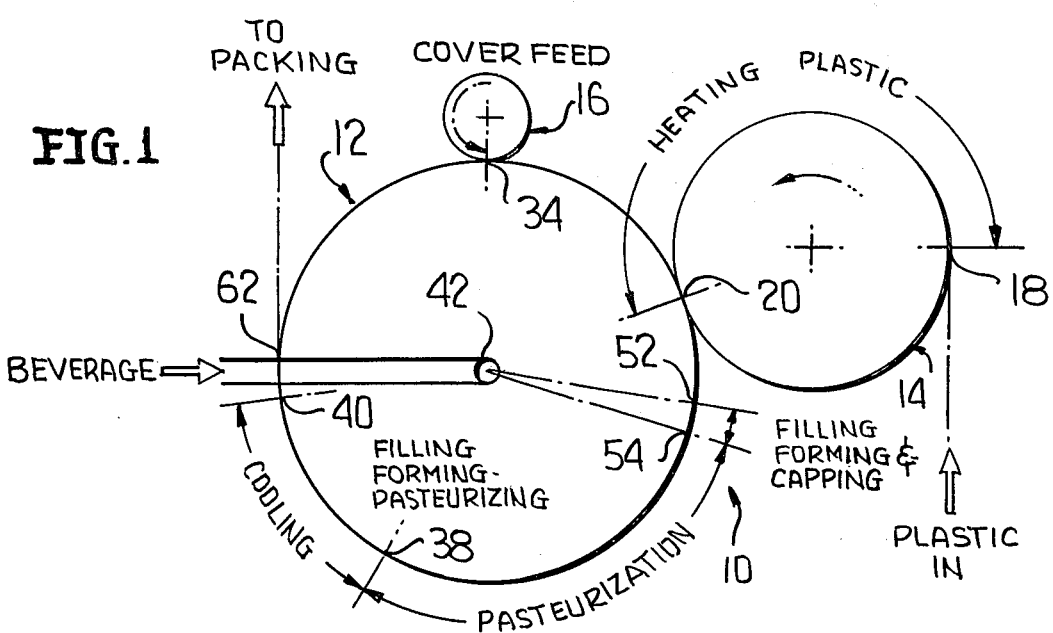
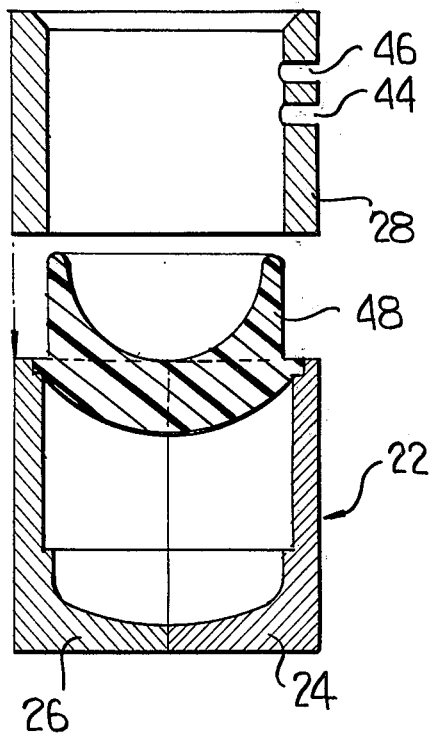
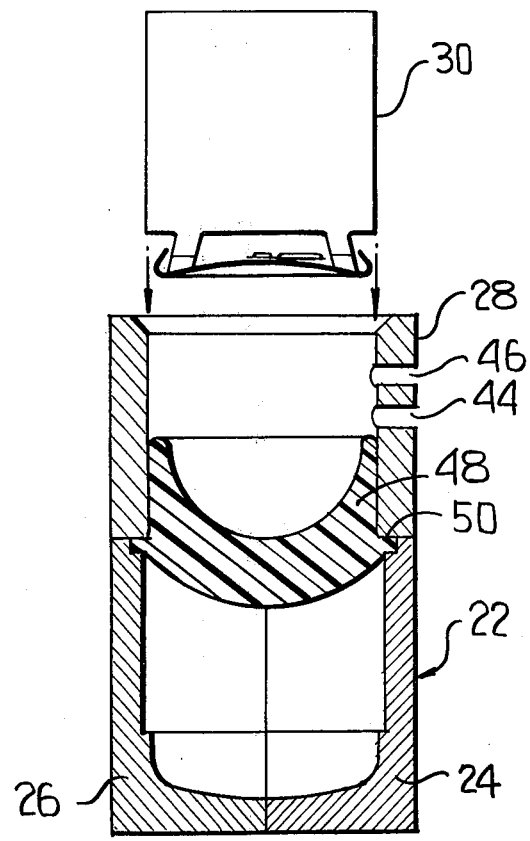

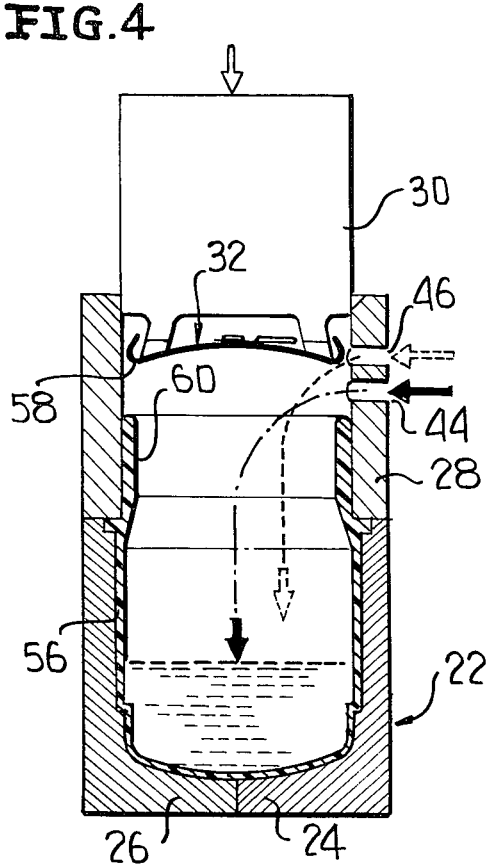
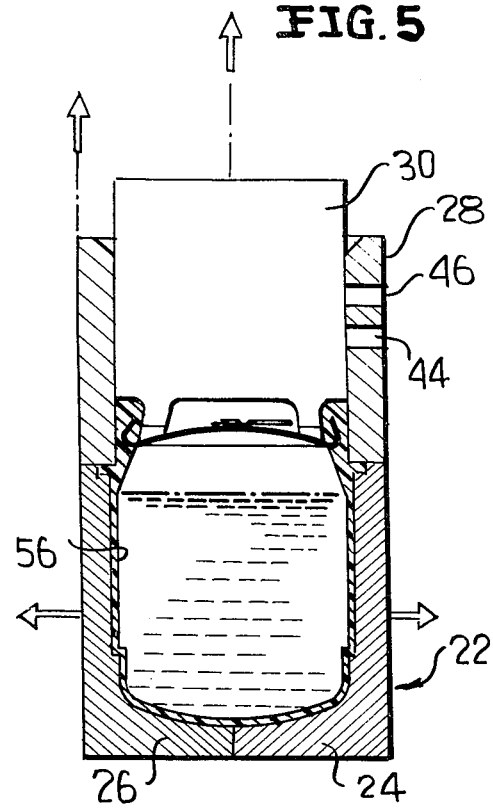
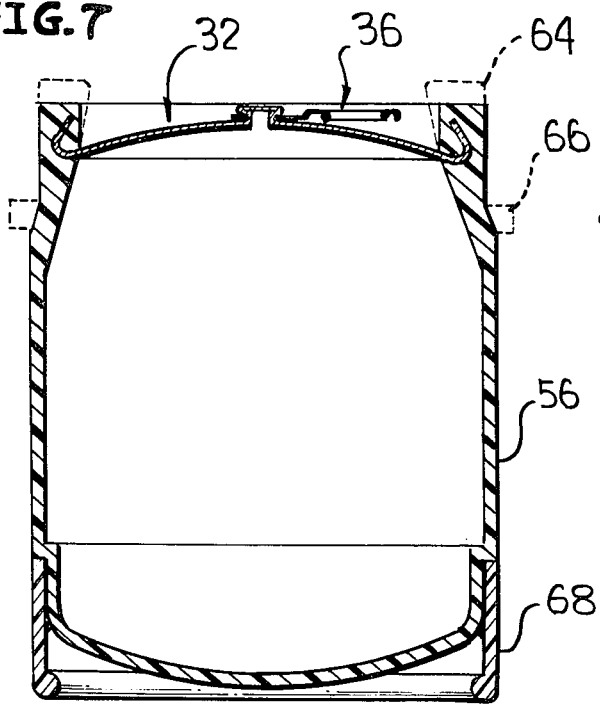
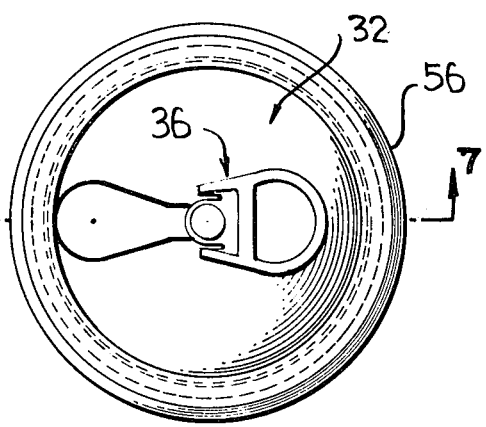
INVENTOR
JENS L. MOLLER

METHOD FOR FORMING, SEALING, CAPPING AND PASTEURIZATION OF BEVERAGE IN PLASTIC CONTAINER

The method of the instant invention uses general structural and operational equipment such as that disclosed in Dietz U.S. Pat. No. 3,296,345, dated Jan. 3, 1967, entitled METHOD OF MAKING MOLDED CONTAINERS.

This equipment has, however, been modified in accordance with the novel method involved in manufacturing the novel container of the instant invention. By the instant invention a container is formed and filled with the beverage to be placed therein in a single step of short duration and is momentarily thereafter closed while the material of which the container has been formed by blow molding is still in a heated plastic state. The heat of the plastic material used to form the container is sufficient to accomplish flash pasteurization of the beverage placed within the container. Of course, if further pasteurization of the beverage is desired, such further pasteurization may be effected subsequent to the discharge of the filled container from the apparatus of the instant invention.

The main object of this invention is to provide a method for simultaneously forming a container and filling the latter with a beverage to be packed therein.

Another important object of this invention, in accordance with the immediately preceding object, is to provide a method which will also be capable of affixing a closure to the open end of the formed container immediately after the container has been formed and filled with a beverage.

Still another important object of this invention is to provide a method for forming, filling and capping or closing a container which will inherently also result in a beverage disposed within the container being subject to flash pasteurization.

Another object of this invention is to provide a method utilizing an apparatus for blow molding a container of heated plastic material and including means for introducing a beverage into the container being formed in a manner such that the pressure of the beverage introduced into the container functions as the means by which the blow molding process of the container is completed.

A final object of this invention to be specifically enumerated herein is to provide a method for forming, filling, capping and pasteurization of beverage in a plastic container which will conform to conventional forms of manufacture so as to provide a device that will be economically feasible.

With the above and other objects in view that will hereinafter appear, the nature of the invention will be more clearly understood by reference to the following detailed description, the appended claimed subject matter, and the several views illustrated in the accompanying drawings.

IN THE DRAWINGS

FIG. 1 is a schematic view illustrating the sequential step involved in the forming, filling and capping of the plastic container as well as the pasteurization of the beverage disposed within the container.

FIG. 2 is a vertical sectional schematic view of the components of one of the mold components carried by the largest turret illustrated in FIG. 1 and with a blank of heated plastic material positioned in the top of a two-piece upwardly opening mold as well as a cylinder positioned above the mold with downward movement into engagement with the latter subsequent to the blank being disposed in place.

FIG. 3 is a view similar to FIG. 2 but with the cylinder shifted downwardly into position engaged with the top of the two-part mold and with a closure cover supporting pistons disposed above the cylinder prior to downward telescoping engagement with the latter.

FIG. 4 is a view similar to FIG. 3 but illustrating the piston in initial position within the upper end of the cylinder and with a beverage being injected into the container formed within the mold subsequent to an initial blow molding of the blank into the mold by gas under pressure admitted into the cylinder immediately below the piston.

FIG. 5 is a view similar to FIG. 4 but with the piston displaced downwardly within the cylinder to embed the closure cover in the plastic upper peripheral wall portions of the blow molded container.

FIG. 6 is a top plan view of the completed container.

FIG. 7 is a vertical sectional view of the completed container after the latter has been allowed to be cooled and a base ring has been applied to the container subsequent to its being formed and filled.

Referring now more specifically to the drawings, the numeral 10 generally designates the assemblage of the instant invention which includes a mold turret referred to in general by the reference numeral 12, a blank forming, heating and feeding turret referred to in general by the reference numeral 14 and a cover feed turret referred to in general by the reference numeral 16.

Plastic material of any suitable type is delivered to the turret 14 as at 18 in any conventional manner. The plastic may be delivered to the turret 14 in ribbon form or in blank form. If the plastic is introduced to the turret 14 in blank form, the blanks may be prefabricated or fabricated as used. Of course, if the plastic is delivered to the turret 14 in ribbon form, the turret 18 is provided with structure for forming the desired blank. In any event, the turret 18 is provided with any form of conventional heating means wherein the plastic of the blank to be discharged from the turret 14 is heated to a plastic state during movement of the plastic from the point 18 on the turret 14 to the point 20 during rotation of the turret 18.

The mold turret 12 has a plurality of circumferentially spaced two-part mold assemblies referred to in general by the reference numeral 22 mounted thereon and each mold assembly 22 includes a pair of semicylindrical mold halves 24 and 26. In addition, the turret 12 includes a cylinder 28 for each mold 22 and a piston 30 for each cylinder 28.

The cover feed turret 16 includes conventional structure whereby closure covers such as that generally referred to by the reference numeral 32 are fed in timed sequence from the turret 16 to the turret 12 at the point 34. The closure cover 32 may be supported from the piston 30 either by magnet or by vacuum and the cover or closure 32 may be provided with a removable pull tab assembly such as that generally referred to by the reference numeral 36.

In addition, the turret 12 includes conventional means for cooling the molds 22 between the points 38 and 40 and a central beverage inlet 42 through which the beverage to be packed in the containers is delivered to the mold turret 12. Of course, the mold turret 12 includes any suitable means for conveying the beverage 42 to the individual cylinders 28. Further, each of the mold turrets 12 includes a further inlet for gas under pressure and means is provided for conveying the gas under pressure to each of the cylinders 28.

With attention now invited more specifically to FIGS. 2–5 of the drawings, it may be seen that each of the cylinders 28 includes a beverage inlet 44 and a gas inlet 46.

As each mold 22 approaches the point of registry of the turrets 12 and 14, the cylinder 28 thereof is elevated above the mold halves 24 and 26 and the piston 30 thereof is elevated above the cylinder 28. Then, the blank 48 from the turret 14 is deposited in the upper end of the mold 22 and the cylinder moves downwardly into engagement with the upper end of the mold 22 so as to form an initial peripheral seal between the blank 48 and the mold 22 as well as the cylinder 28 as at 50. Thereafter, the piston 30 having previously been provided with a closure cover 32 at the point 34, the piston 30 is moved downwardly into the upper end of the cylinder 28 so as to close the latter above the blank 48. Of course, when the blank 48 is discharged from the turret 14 into the upper end of the mold 22, the blank 48 is in a heated plastic state.

Initial downward movement of the piston 30 into the upper end of the cylinder 28 is terminated with the piston 30 spaced above the inlets 44 and 46. Thereafter, as the mold 22 reaches the point 52, a gas or a similar fluid or fluent material is introduced into the cylinder 28 through the inlet 46 to initiate blow molding of the blank 48 downwardly into the mold 22. However, the gas introduced into the cylinder 28 through the inlet 46 is not sufficient to complete blow molding of the blank 48. However, during substantially the same period of time that the gas under pressure is being introduced into the cylinder 28, the beverage or a similar fluid or fluent material to be contained within the container being formed is introduced into the cylinder 28 through the inlet 44 whereupon completion of downward blow molding of the blank 48 into the mold 22 is completed in the manner illustrated in FIG. 4 of the drawings. Before the turret 12 moves from the position 52 to the position 54, the piston 30 is shifted downwardly in the cylinder 28 to sequentially close the inlets 46 and 44 and thereby terminate the introduction of gas and beverage into the cylinder 28 and thus the container 56 which has been blow molded in the mold 22. However, as the piston 30 closes the inlet 44, it continues to move downwardly in the cylinder 28 so as to displace the peripheral portions 58 of the closure cover 32 downwardly within the cylinder 28 sufficiently to embed the peripheral portions 58 in the upper peripheral portions 60 of the container 56 which has been blow molded in the mold 22. Of course, these upper peripheral portions are still in a plastic state and thus the upper peripheral portions 60 readily flow about the peripheral portions 58 of the closure cover 32 resulting in the peripheral portions 58 being fully embedded within the upper peripheral portions of the container 56 as illustrated in FIG. 5 of the drawings. Thereafter, the cylinder 28 and piston 30 are upwardly displaced relative to the mold 22 and the mold halves 24 and 26 are horizontally separated. However, before the components 28, 30, 24 and 26 are displaced apart, the mold 22 must pass from the point 54 to the point 38 during which period the heat of the container 56 functions to flash pasteurize the beverage within the container 56. After the mold 22 reaches the position 38, the mold 22 is cooled in order to cool the formed container 56 prior to its discharge from the mold turret 12 as at 62.

Subsequent to the container 56 being discharged from the turret 12, the peripheral portions 64 and 66 may be trimmed from the container. In addition, a lower end protective sleeve 68 may be applied to the container 56 if desired.

It will be appreciated that containers of shapes different from the shape of the container 56 may be formed by the apparatus of the instant invention and by following the method steps by which the container 56 is formed. Further, if the beverage to be contained within the container 56 is carbonated, the gas utilized to initially blow mold the blank 48 may comprise carbon dioxide. However, if the beverage to be contained within the container 56 is of the noncarbonated type, nitrogen may be used as the gas for initially blow molding the blank 48.

While preferred forms and arrangements of parts have been shown in illustrating the invention, it is to be clearly understood that various changes in details and arrangement of parts may be made without departing from the spirit and scope of this disclosure.

I claim:

1. A method of forming a container comprising the steps of providing a mold cavity adapted to receive a heated plastic blank, enclosing an area outwardly of the mold cavity after the blank has been inserted therein, supporting a closure within the area prior to the formation of the blank into an open ended container, introducing fluid under pressure into the area thereby forming the blank to the configuration of the mold cavity to form an open ended container therein while the blank still retains sufficient heat to remain in a plastic state, and thereafter securing a peripheral edge of the closure to the container thereby closing the latter.

2. The method as defined in claim 1 including the step of relatively moving said closure and container toward each other to achieve the securement of the closure peripheral edge to the container.

3. The method as defined in claim 2 wherein the fluid introducing step includes first introducing a gas into said area and additionally introducing a liquid in said area both prior to the securement of said closure to said container.

4. The method as defined in claim 2 wherein the closure supporting step is performed when the closure is at least partially housed within said area.

5. The method as defined in claim 2 wherein the fluid introducing step is performed by porting fluid through the enclosing means.

6. The method as defined in claim 2 wherein the supporting step is performed internally of said enclosing means.

7. The method as defined in claim 6 wherein the fluid introducing step is performed by porting fluid through the enclosing means.

8. The method as defined in claim 1 wherein said fluid introducing step includes first introducing a gas into said area and additionally introducing a liquid in said area both prior to the securement of said closure to said container.

9. The method as defined in claim 1 wherein the closure supporting step is performed when the closure is at least partially housed within said area.

10. The method as defined in claim 9 wherein the supporting step is performed internally of said enclosing means.

11. The method as defined in claim 1 wherein the closure supporting step is performed when the closure is at least partially housed within said area, and the securing step is performed by relatively moving said closure and container toward each other to achieve securement of the closure peripheral edge to the container.

12. The method as defined in claim 1 wherein the supporting step is performed internally of said enclosing means.

13. The method as defined in claim 1 including the step of clamping the blank in spanning relationship between the enclosing means and the mold cavity.

14. The method as defined in claim 1 wherein the fluid introducing step is performed by porting fluid through the enclosing means.

15. The method as defined in claim 1 including the step of removing the container and united closure from the mold cavity after the performance of the securing step.

* * * * *